(12) United States Patent
Byun et al.

(10) Patent No.: US 10,460,695 B2
(45) Date of Patent: Oct. 29, 2019

(54) ELECTROCHROMIC DISPLAY DEVICE HAVING A PLURALITY OF SUB-FRAMES

(71) Applicant: Electronics and Telecommunications Research Institute, Daejeon (KR)

(72) Inventors: Chunwon Byun, Daejeon (KR); Sang Hoon Cheon, Daejeon (KR); Hyunkoo Lee, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 71 days.

(21) Appl. No.: 15/818,838

(22) Filed: Nov. 21, 2017

(65) Prior Publication Data
US 2018/0151147 A1    May 31, 2018

(30) Foreign Application Priority Data

Nov. 28, 2016  (KR) .................. 10-2016-0159617
Apr. 18, 2017  (KR) .................. 10-2017-0049999

(51) Int. Cl.
*G09G 3/38*    (2006.01)
*G02F 1/163*   (2006.01)
*G02F 1/155*   (2006.01)
*G09G 3/20*    (2006.01)

(52) U.S. Cl.
CPC .............. *G09G 3/38* (2013.01); *G02F 1/155* (2013.01); *G02F 1/163* (2013.01); *G02F 2001/1635* (2013.01); *G02F 2201/121* (2013.01); *G02F 2201/123* (2013.01); *G09G 3/2081* (2013.01); *G09G 2300/0809* (2013.01); *G09G 2310/061* (2013.01); *G09G 2310/08* (2013.01); *G09G 2330/028* (2013.01)

(58) Field of Classification Search
CPC ........................................................ G09G 3/38
USPC ........................................................ 345/212
See application file for complete search history.

(56) References Cited

U.S. PATENT DOCUMENTS 7,352,500 B2      4/2008  Jagt et al.
2004/0263440 A1*  12/2004 Kimura ............... G09G 3/2011
                                               345/76
2005/0270619 A1   12/2005 Johnson et al.
(Continued)

FOREIGN PATENT DOCUMENTS

KR   10-2013-0091887 A    8/2013
KR   10-2014-0019989 A    2/2014

*Primary Examiner* — Long D Pham
(74) *Attorney, Agent, or Firm* — Rabin & Berdo, P.C.

(57) ABSTRACT

Provided is an electrochromic display device including a display panel including a plurality of pixels configured to display an image on a basis of a unit frame defined as first to third sub-frames, a timing controller configured to output a data signal and an off signal, and a data driving circuit configured to provide, to the pixels, a data voltage generated based on the data signal during the second sub-frame and provide, to the pixels, an off voltage generated based on the off signal during the third sub-frame, wherein each of the pixels includes an electrochromic element, and a power supply voltage is delivered to the electrochromic element in response to the data voltage during the second sub-frame and the power supply voltage provided to the electrochromic element is blocked in response to the off voltage during the third sub-frame.

19 Claims, 12 Drawing Sheets

(56) References Cited

U.S. PATENT DOCUMENTS

| | | | |
|---|---|---|---|
| 2006/0066933 A1* | 3/2006 | Jagt | G02F 1/15 359/265 |
| 2010/0141646 A1* | 6/2010 | Tanabe | G09G 3/2022 345/214 |
| 2011/0157216 A1* | 6/2011 | Yamazaki | G02F 1/133553 345/596 |
| 2013/0208022 A1 | 8/2013 | Ryu et al. | |
| 2014/0042475 A1 | 2/2014 | Park et al. | |

* cited by examiner

FIG. 8

| | | | |
|---|---|---|---|
| PX11 | PX12 | PX13 | PX14 |
| DE21 | DE22 | DE23 | DE24 |
| PX21 | PX22 | PX23 | PX24 |
| DE25 | DE26 | DE27 | DE28 |

GL1 → (row 1)
GL2 → (row 3)

FIG. 9

| OFF Control Signal | First Subfield (1-SF) | Second Subfield (2-SF) | Third Subfield (3-SF) | Fourth Subfield (4-SF) |
|---|---|---|---|---|
| 00 | - | - | - | P |
| 01 | - | - | P | - |
| 10 | - | P | - | - |
| 11 | P | - | - | - |
| 11 | P | - | - | - |
| 10 | - | P | - | - |
| 01 | - | - | P | - |
| 00 | - | - | - | P |

FIG. 10

| PX11 (0%) | PX12 (25%) | PX13 (50%) | PX14 (80%) |
|---|---|---|---|
| PX21 (80%) | PX22 (50%) | PX23 (25%) | PX24 (0%) |

<Gradation>

ELECTROCHROMIC DISPLAY DEVICE HAVING A PLURALITY OF SUB-FRAMES

CROSS-REFERENCE TO RELATED APPLICATIONS

This U.S. non-provisional patent application claims priority under 35 U.S.C. § 119 of Korean Patent Application Nos. 10-2016-0159617, filed on Nov. 28, 2016, and 10-2017-0049999, filed on Apr. 18, 2017, the entire contents of which are hereby incorporated by reference.

BACKGROUND

The present inventive concepts relates to a display device, and more particularly, to an electrochromic display device.

An electrochromic display device is a device of which a transmissive characteristic is changed in response to a change in color of an electrochromic material due to electric reduction-oxidation according to application of a voltage. An electrochromic device is being applied to various fields such as a smart window, smart mirror, display device, and camouflage device, since it is advantageous in that optical transmittance may be changed due to application of an electric field.

In particular, the electrochromic display device does not require a polarization plate, etc., and does not depend on a viewing angle. Furthermore, the electrochromic display device is non-emissive and has advantages of excellent ease of enlargement according simple structure, and capability of various colored emissions according to selection of a material.

However, due to a slow speed of response, it is difficult to implement an existing electrochromic display device with an active matrix. In addition, considering an electro-optical characteristic of an electrochromic element, an internal pressure of the electrochromic element is low compared to those of other display elements.

For example, a liquid crystal (LC) element and an organic light emitting diode (OLED) element are enabled to receive a voltage of 10 V and able to be tolerant to a voltage higher than that. However, the electrochromic element has a limitation in that the electro-optical characteristic is destroyed at a voltage of about 3V.

SUMMARY

Some embodiments of the present inventive concepts provides an electrochromic display device for controlling an electric charge amount provided to an electrochromic element on the basis of a plurality of sub-frames, and having an active-matrix pixel structure.

An object of the present inventive concepts is not limited to the above-mentioned one, other objects which have not been mentioned above will be clearly understood to those skilled in the art from the following description.

According to exemplary embodiments of the present inventive concepts, an electrochromic display device including: a display panel including a plurality of pixels configured to display an image on a basis of a unit frame defined as first to third sub-frames; a timing controller configured to output a data signal and an off signal; and a data driving circuit configured to provide, to the pixels, a data voltage generated based on the data signal during the second sub-frame and provide, to the pixels, an off voltage generated based on the off signal during the third sub-frame, wherein each of the pixels includes an electrochromic element, and a power supply voltage is delivered to the electrochromic element in response to the data voltage during the second sub-frame, and the power supply voltage provided to the electrochromic element is blocked in response to the off voltage during the third sub-frame.

In an embodiment, the third sub-frame may include a plurality of time-continuous first to n-th subfields, and the power supply voltage provided to the electrochromic element may be blocked at a time point of one corresponding subfield among the first to n-th subfields.

In an embodiment, the timing controller may further output an off control signal to the data driving circuit, and the data driving circuit may determine a plurality of subfields respectively corresponding to the pixels among the first to n-th subfields in response to the off control signal.

In an embodiment, the off control signal may be provided with k bits (where k is a natural number of 2 or greater), and a number of the first to n-th subfields included in the third sub-frame may be determined based on the k bits.

In an embodiment, the electrochromic display device may further include a power supply driving circuit configured to provide the power supply voltage and a ground voltage to each of the pixels, wherein, during the first sub-frame, the power supply driving circuit provides the power supply voltage for resetting the electrochromic element and the ground voltage to the pixels.

In an embodiment, the display panel may further include a plurality of scan lines, a plurality of data lines, and a power supply line, which are connected to the pixels, and each of the scan lines may include a first scan line and a second scan line, and each of the data lines may include a first data line and a second data line.

In an embodiment, the data voltage may include a first data voltage and a second data voltage, and each of the pixels may include: a first driving unit connected to the first scan line, the first data line, and the power supply line, and configured to receive the first data voltage through the first data line; and a second driving unit connected to the second scan line, the second data line, and the first driving unit, and configured to receive the second data voltage through the second data line.

In an embodiment, during the second sub-frame, the first driving unit may output, to the second driving unit, the power supply voltage received through the power supply line in response to the first data voltage, and the second driving unit may deliver, to the electrochromic element, the power supply voltage received from the first driving unit in response to the second data voltage.

In an embodiment, during the third sub-frame, the second driving unit may block the power supply voltage from being provided to the electrochromic element in response to the off voltage provided through the second data line.

In an embodiment, each of the pixels may further include: a first transistor including a first scan terminal connected to the first scan line, a first terminal connected to the first data line, and a second terminal; a second transistor including a second scan terminal connected to the second terminal, a third terminal connected to the power supply line, and a fourth terminal; a third transistor including a third scan terminal connected to the second scan line, a fifth terminal connected to the second data line, and a sixth terminal; and a fourth transistor including a fourth scan terminal connected to the sixth terminal, a seventh terminal connected to the fourth terminal, and an eighth terminal, wherein the electrochromic element is connected to the eighth terminal.

In an embodiment, each of the pixels may further include: a first capacitor disposed between the power supply line and a node between the first and second transistors; and a second capacitor disposed between the power supply line and a node between the third and fourth transistors.

In an embodiment, the electrochromic display device may further include a power supply driving circuit configured to output the power supply voltage and a ground voltage, wherein the power supply driving circuit provides the power supply voltage to one end of the electrochromic element, and provides the ground voltage to another end of the electrochromic element.

In an embodiment, the display penal may include: a first base substrate; a display layer including the pixels on the first base substrate; an electrochromic layer on the display layer, a common electrode layer on the electrochromic layer, and a second base substrate on the common electrode layer.

According to exemplary embodiments of the present inventive concepts, an electrochromic display device includes: a display panel including a plurality of pixels configured to display an image on a basis of a unit frame defined as first to third sub-frames, a plurality of scan lines connected to the pixels, a plurality of data lines, and a power supply line; a timing controller configured to output a data signal and an off signal; and a data driving circuit configured to provide, to the pixels, a first data voltage generated based on the data signal during the second sub-frame and provide, to the pixels, a second data voltage generated based on the data signal, and an off voltage generated based on the off signal, during the third sub-frame, wherein each of the pixels includes an electrochromic element, the third sub-frame includes a charging period and an off period subsequent to the charging period, and a power supply voltage is delivered to the electrochromic element in response to the second data voltage during the charging period, and the power supply voltage provided to the electrochromic element is blocked in response to the off voltage during the off period.

In an embodiment, each of the scan lines may include a first scan line and a second scan line, and each of the data lines may include a first data line and a second data line, and each of the pixels may further include: a first driving unit connected to the first scan line, the first data line, and the power supply line, and configured to receive the first data voltage through the first data line, during the second sub-frame; and a second driving unit connected to the second scan line, the second data line, and the first driving unit, and configured to receive the second data voltage through the second data line during the charging period.

In an embodiment, during the off period, the second driving unit may block the power supply voltage from being provided to the electrochromic element in response to the off voltage received through the second data line.

In an embodiment, each of the scan lines may include a first scan line and a second scan line, and each of the pixels may further include: a first transistor including a first scan terminal connected to the first scan line, a first terminal connected to a corresponding data line among the data lines, and a second terminal; a second transistor including a second scan terminal connected to the second terminal, a third terminal connected to the power supply line, and a fourth terminal; a third transistor including a third scan terminal connected to the second scan line, a fifth terminal connected to the data line, and a sixth terminal; and a fourth transistor including a fourth scan terminal connected to the sixth terminal, a seventh terminal connected to the fourth terminal, and an eighth terminal, wherein the electrochromic element is connected to the eighth terminal.

In an embodiment, the data driving circuit may output the first data voltage to the first data line during the second sub-frame, and may output the second data voltage to the data line during the charging period.

In an embodiment, the data driving circuit may output the off voltage to the data line during the off period.

BRIEF DESCRIPTION OF THE FIGURES

The accompanying drawings are included to provide a further understanding of the inventive concepts, and are incorporated in and constitute a part of this specification. The drawings illustrate exemplary embodiments of the inventive concepts and, together with the description, serve to explain principles of the inventive concepts. In the drawings:

FIG. 8 is a table exemplarily showing pixels connected to a first scan line and a second scan line among a plurality of scan lines;

FIG. 9 is a table exemplarily showing a data voltage provided to pixels during the third sub-frame;

FIG. 10 is an example showing a grayscale of an image displayed by the pixels shown in FIG. 8 on the basis of a unit frame;

DETAILED DESCRIPTION

Figure 1:
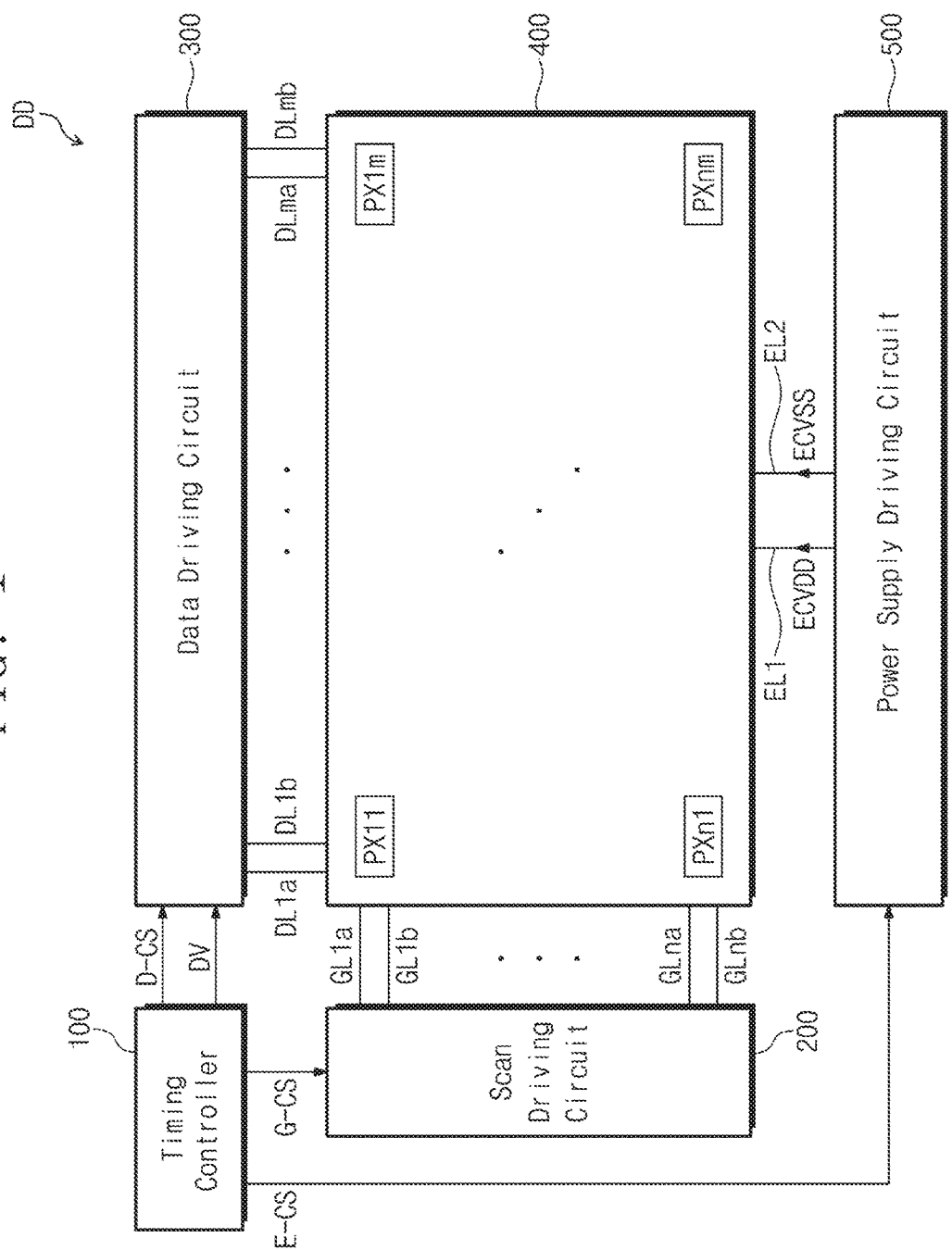
FIG. 1 is a block diagram showing an electrochromic display device according to an embodiment of the present inventive concepts.

The present invention may be variously modified and realized in various forms, and thus specific embodiments will be exemplified in the drawings and described in detail hereinbelow. However, the present invention is not limited to the specific disclosed forms, and needs to be construed to include all modifications, equivalents, or replacements included in the spirit and technical range of the present invention.

Like reference numerals refer to like elements throughout. In the drawings, the dimensions of structures are exaggerated or contracted for clarity of illustration. It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments.

As used herein, the singular forms "a," "an" and "the" are intended to include the plural forms as well, unless the context clearly indicates otherwise.

It will be further understood that the terms "comprises", "comprising,", "includes" and/or "including", when used herein, specify the presence of stated features, integers, steps, operations, elements, components or combinations thereof, but do not preclude the presence or addition of one or more other features, integers, steps, operations, elements, components, or combinations thereof.

Figure 2:
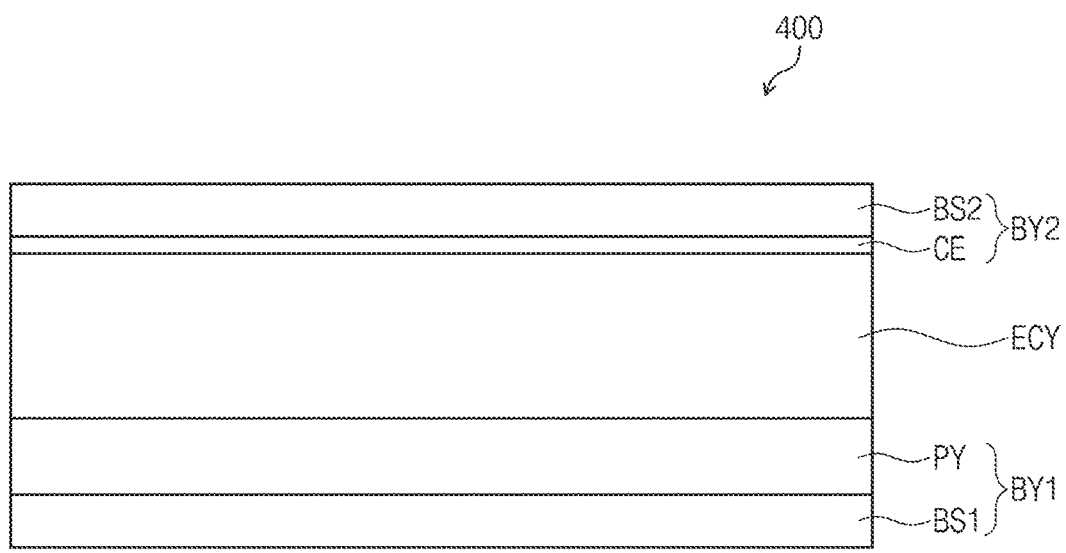
FIG. 2 is a cross-sectional view along one side of the display panel illustrated in FIG. 1.
Figure 3:
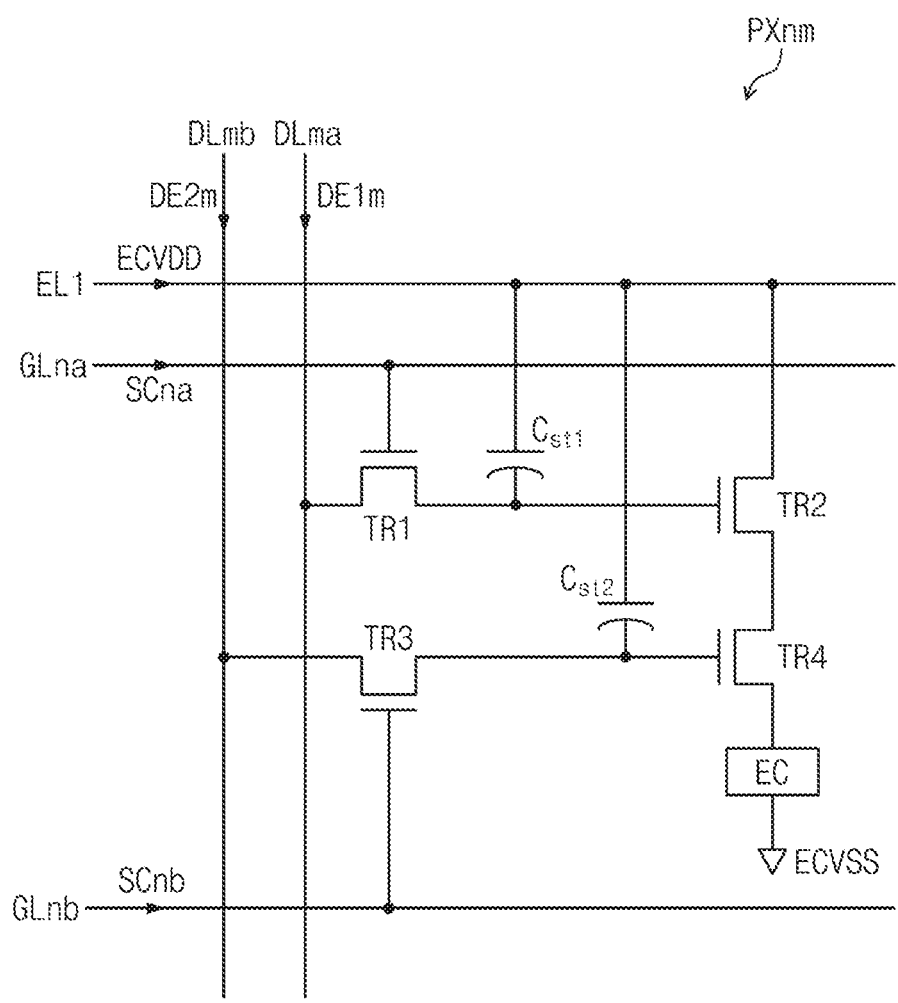
FIG. 3 is a circuit diagram of a pixel disposed in the display panel illustrated in FIG. 1.

FIG. 1 is a block diagram of an electrochromic display device according to an embodiment of the present inventive concept. FIG. 2 is a cross-sectional view along one side of the display panel illustrated in FIG. 1. FIG. 3 is a circuit diagram of a pixel disposed in the display panel illustrated in FIG. 1.

First, referring to FIG. 1, a display device DD includes a timing controller 100, a scan driving circuit 200, a data driving circuit 300, a display panel 400, and a power supply driving circuit 500.

Although the timing controller 100 is not shown, a plurality of driving signals and a plurality of control signals may be received externally. The timing controller 100 converts the external driving signals to driving signals DV suitable for an operation mode of the display panel 400, and delivers the driving signals DV to the data driving circuit 300.

In addition, the timing controller 100 may receive, as control signals, a vertical synchronization signal, a horizontal synchronization signal, a main clock signal, and a data enable signal, etc., and may output a scan control signal G-CS, a data control signal D-CS, and a power supply control signal E-CS. The timing controller 100 provides the scan control signal G-CS to the scan driving circuit 200 and the data control signal D-CS to the data driving circuit 300. Furthermore, the timing controller 100 provides the power supply control signal E-CS to the power supply driving circuit 500.

According to an embodiment of the present inventive concept, the display device DD may display one image during a unit frame. In particular, a unit frame according to an embodiment of the present inventive concept may be defined as a plurality of sub-frames. Hereinafter, the sub-frames will be described to include a reset period, a programming period, and a gray selection period. An operation of the display device DD according to sub-frames will be described in detail in relation to FIG. 4.

According to an embodiment of the present inventive concept, the driving signals DV may include an initial signal activated in the reset period, a data signal activated in the programming period, and an off signal activated in the gray selection period. In other words, the timing controller 100 provides, to the data driving circuit 300, signals respectively corresponding to the above-described reset period, programming period, and gray selection period.

The scan driving circuit 200 outputs scan signals in response to the scan control signal G-CS. For example, the scan control signal G-CS may include a vertical start signal for starting an operation of the scan driving circuit 200, a scan clock signal for determining an output time of a scan voltage, and an output enable signal for determining on-pulse width of the scan voltage, etc.

The data driving circuit 300 receives the data control signal D-CS and the driving signals DV. The data control signal D-CS may include a horizontal start signal for starting an operation of the data driving circuit 300 and an output instruction signal, etc. The data driving circuit 300 may determine output times of driving voltages to be provided to the display panel 400 on the basis of the output instruction signal. The data driving circuit 300 may generate driving voltages in response to the driving signals DV. For example, the driving voltages may include an initial voltage, a data voltage and an off voltage.

In detail, the data driving circuit 300 outputs the initial voltage to the display panel 400 on the basis of an initial signal during the reset period. The data driving circuit 300 outputs the data voltage to the display panel 400 on the basis of the data signal during the programming period. The data driving circuit 300 outputs the off voltage to the display panel 400 on the basis of the off signal during the gray selection period.

According to an embodiment of the present inventive concept, the scan driving circuit 200 may provide two signals of a first scan signal and a second scan signal to each of a plurality of pixels PX11 to PXnm disposed in the display panel 400. The data driving circuit 300 may provide two voltages of a first driving voltage and a second driving voltage to each of the plurality of pixels PX11 to PXnm.

The display panel 400 may include a plurality of scan lines, a plurality of data lines, power supply lines EL1 and EL2, and the plurality of pixels PX11 to PXnm.

According to an embodiment of the preset inventive concept, the plurality of scan lines may include a plurality of first scan lines GL1a to GLna and a plurality of second scan lines GL1b to GLnb. In other words, the scan driving circuit 200 sequentially outputs the first scan signals through the plurality of first scan lines GL1a to GLna and sequentially outputs the second scan lines through the plurality of second scan lines GL1b to GLnb.

According to an embodiment of the present inventive concept, a plurality of data lines may include a plurality of first data lines DL1a to DLma and a plurality of second data lines DL1b to DLmb. In other words, the data driving circuit 300 outputs the first driving voltages through the plurality of first data lines DL1a to DLma and outputs the second driving voltages through the plurality of second data lines DL1b to DLmb.

According to an embodiment of the present inventive concept, the data driving circuit 300 may output, as the above-described initial voltages, the first driving voltages and the second driving voltages to the display panel 400.

The data driving circuit 300 may output, as the data voltages, the first driving voltages and the second driving voltages to the display panel 400. In other words, as the data voltages, the first driving voltages output from the data driving circuit 300 may be described as the first data voltages, and the second driving voltages may be described as the second data voltages. In this case, the data driving circuit 300 may output, to the display panel 400, the first driving voltages and the second voltages on the basis of the data signals during the programming period. However, the present inventive concept is not limited thereto, and the data driving circuit 300 may output the first driving voltages to the display panel 400 during the programming period and output the second driving voltages to the display panel 400 during the gray selection period.

On the other hand, the data driving circuit 300 may not output the first driving voltages to the display panel and may output only the second driving voltages to the display panel 400. In other words, the second driving voltages may be described as the off voltages.

According to an embodiment of the inventive concept, the plurality of pixels PX11 to PXnm are arranged in a matrix type and each of which may include an electrochromic element. The electrochromic element means an element of which color is changed to a prescribed color, when an electrochromic material therein is provided with an electron or a hole The display panel 400 according to an embodiment of the present inventive concept may be applied to the electrochromic display panel.

The power supply driving circuit 500 outputs a first power supply voltage ECVDD and a second power supply voltage ECVSS to the display panel 400 in response to the power supply control signal E-CS provided from the timing controller 100. In other words, the power supply driving circuit 500 may provide, to each pixel, the first power supply voltage ECVDD and the second power supply voltage ECVSS through the first power supply line EL1 and the second power supply line EL2 connected to each pixel. For example, the second power supply voltage ECVSS may be a ground voltage.

Referring to FIG. 2, the display panel 400 may include a first base layer BY1, an electrochromic layer ECY, and a second base layer BY2.

The first base layer BY1 includes a first base substrate BS1 and a display layer PY disposed on the first base substrate BS1. Here, the first base substrate BS1 may be a support layer that entirely supports the display panel 400. The display layer PY may include a plurality of scan lines, a plurality of data lines, the plurality of pixels PX11 to PXnm, and power supply lines EL1 and EL2. In particular, the display layer PY may include a pixel electrode included in each pixel.

The second base layer BY2 may face the first base layer BY1 with a certain gap therebetween. The second base layer BY2 includes a common electrode layer CE and a second base substrate BS2 disposed on the common electrode layer CE. Here, the second base substrate BS2 may also be applied as a thin-film encapsulation layer, etc.

The electrochromic layer ECY may be disposed between the common electrode layer CE and the display layer PY. The electrochromic layer is a layer of which color is reversibly changed by a voltage difference between the pixel electrode included in the display layer PY and the common electrode included in the common electrode layer CE.

For example, the electrochromic layer ECY may include an electrochromic material and an electrolyte. In other words, when a current flows into the electrochromic layer ECY through the pixel electrode included in the display layer PY, the electrochromic layer ECY may be bleached. On the contrary, when a current flows out from the electrochromic layer ECY through the pixel electrode, the electrochromic layer ECY may be colorized.

Referring to FIG. 3, a circuit diagram for any one pixel PXnm among the plurality of pixels PX11 to PXnm illustrated in FIG. 1 is disclosed. A structure of the pixel PXnm illustrated in FIG. 3 may be applied to each structure of the plurality of pixels PX11 to PXnm.

In detail, each pixel PXnm may include a first driving unit, a second driving unit, and an electrochromic element EC.

The first driving unit includes a first transistor TR1, a second transistor TR2, and a first capacitor Cst1. The first transistor TR1 includes a first gate terminal connected to the first scan line GLna, a first terminal connected to the first data line DLma, and a second terminal. The second transistor TR2 includes a second gate terminal connected to the second terminal of the first transistor TR1, a third terminal connected to the first power supply line EL1, and a fourth terminal. The first capacitor Cst1 includes a first electrode connected between the second terminal of the first transistor TR1 and the second gate terminal of the second transistor TR2, and a second electrode connected to the first power supply line EL1.

The first transistor TR1 receives a first scan signal SCna through the first gate terminal and a first driving voltage $DE1m$ through the first terminal. The first transistor TR1 may provide the first driving voltage $DE1m$ to the second gate terminal of the second transistor TR2 in response to the first scan signal SCna. Here, the first driving voltage $DE1m$ may be an analog voltage. The second transistor TR2 may provide, to the fourth terminal, the first power supply voltage ECVDD received through the third terminal in response to the first driving voltage $DE1m$. The first capacitor Cst1 may be charged by the first driving voltage DE m provided through the second terminal of the first transistor TR1.

The second driving unit includes a third transistor TR3, a fourth transistor TR4, and the second capacitor Cst2. The third transistor TR3 includes a third gate terminal connected to the second scan line GLnb, a fifth terminal connected to the second data line DLmb, and a sixth terminal. The fourth transistor TR4 includes a fourth gate terminal connected to the fifth terminal of the third transistor TR3, a seventh terminal connected to the fourth terminal of the second transistor TR2, and an eighth terminal. The second capacitor Cst2 includes a third electrode connected between the fifth terminal of the third transistor TR3 and the fourth gate terminal of the fourth transistor TR4, and a fourth electrode connected to the first power supply line EL1.

The third transistor TR3 receives the second scan signal SCnb through the third gate terminal and a second driving voltage $DE2m$ through the fifth terminal. The third transistor TR3 may provide the second driving voltage $DE2m$ to the fourth gate terminal of the fourth transistor TR4 in response to the second scan signal SCnb. Here, the second driving voltage $DE2m$ may be a digital voltage and for example, the second driving voltage $DE2m$ may be higher than the first driving voltage $DE1m$. The fourth transistor TR4 may provide, to the eighth terminal, the first power supply voltage ECVDD received through the seventh terminal in response to the second driving voltage $DE2m$. The second capacitor Cst2 may be charged by the second driving voltage $DE2m$ provided through the sixth terminal of the third transistor TR3.

One end of the electrochromic element EC may be connected to the eighth terminal of the fourth transistor TR4. In this case, the one end of the electrochromic element EC may be connected to the pixel electrode. Furthermore, the other end of the electrochromic element EC may be connected to the second power supply line EL2. In this case, the other end of the electrochromic element EC may be connected to the common electrode. In other words, the one end of the electrochromic element EC may receive the first power supply voltage ECVDD delivered from the fourth transistor TR4 and the other end may receive the second power supply voltage ECVSS delivered from the second power supply line EL2.

Figure 4:
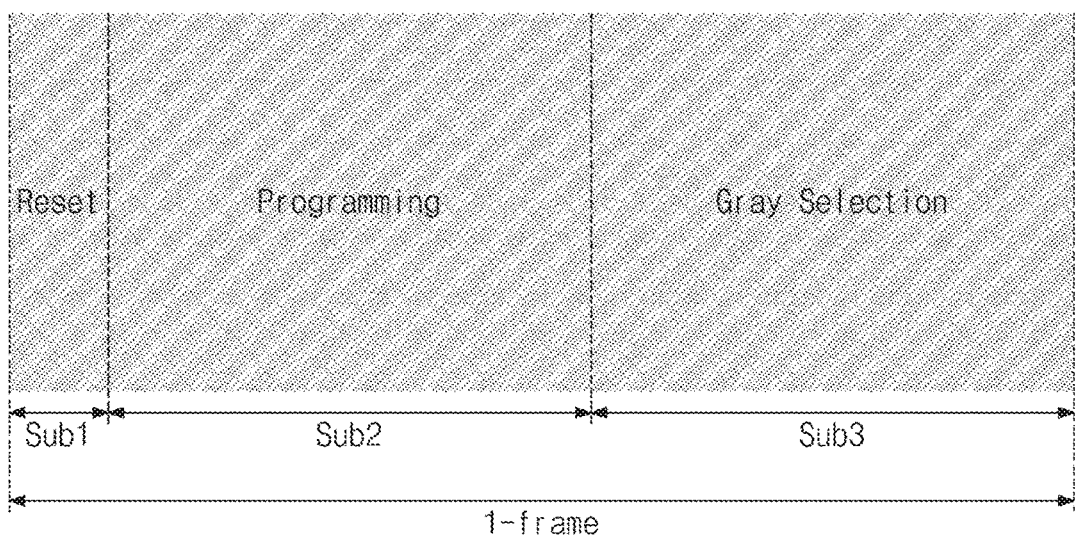
FIG. 4 shows driving of a display device based on a unit frame according to an embodiment of the present inventive concepts.
Figure 5:
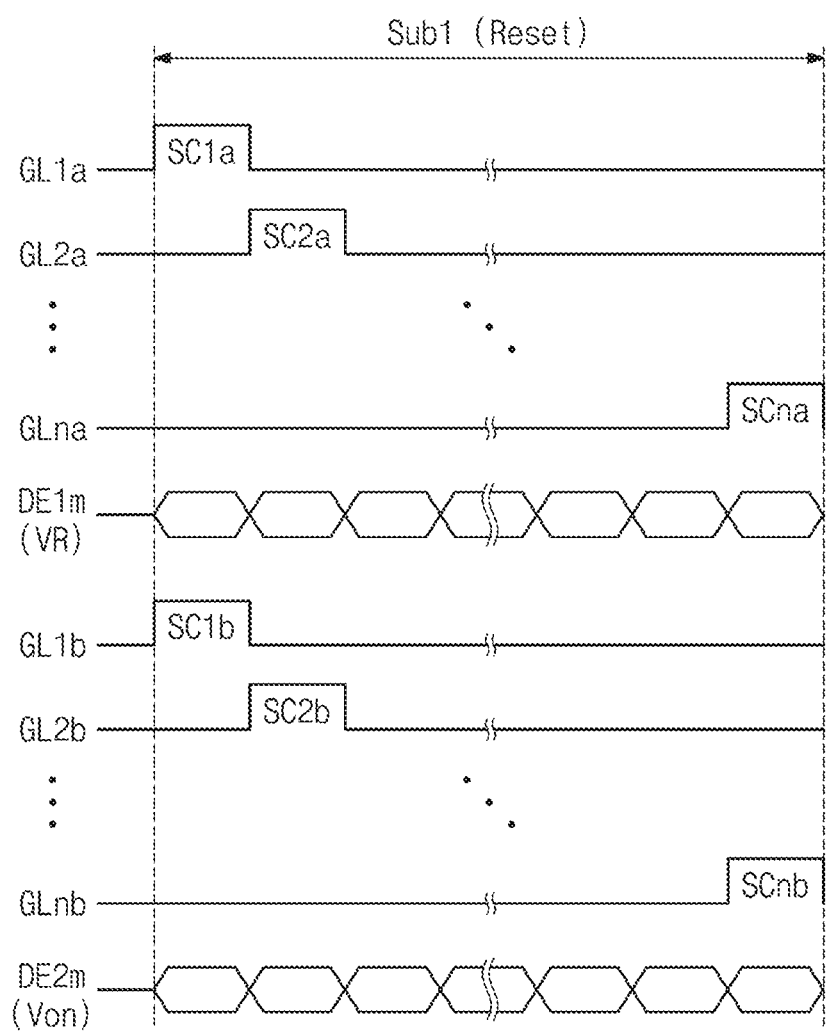
FIG. 5 is a timing diagram showing driving of the display device according to the first sub-frame illustrated in FIG. 4.
Figure 6:
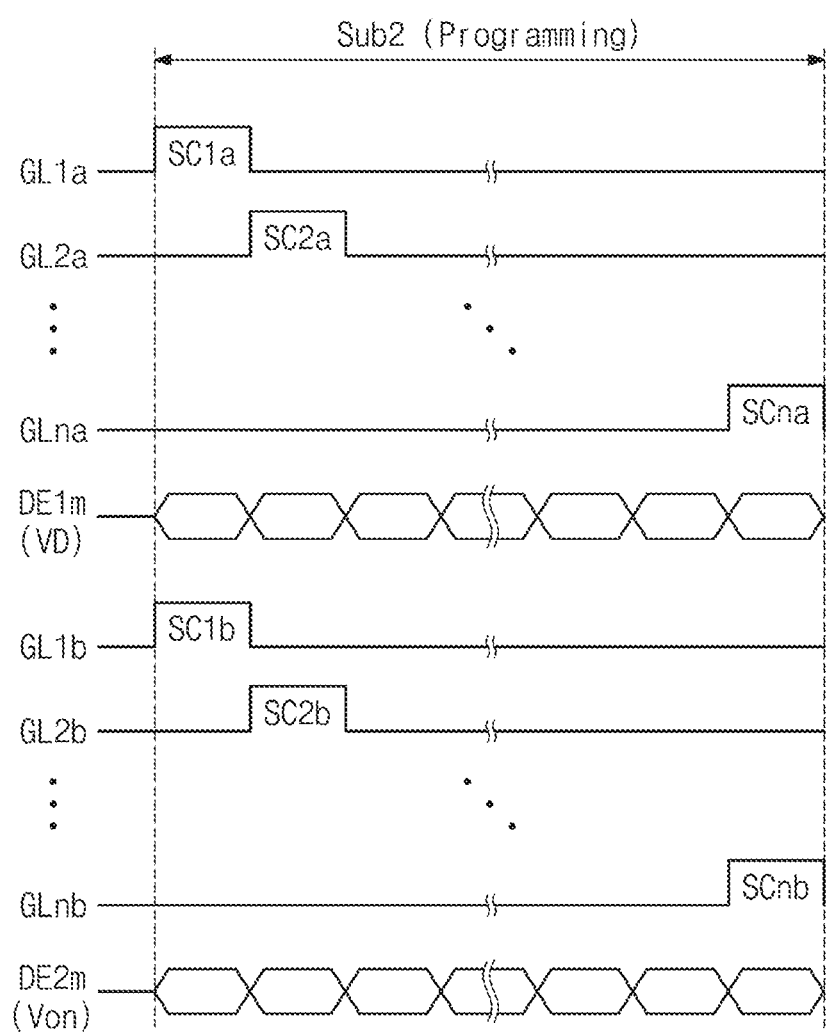
FIG. 6 is a timing diagram showing driving of the display device according to the second sub-frame illustrated in FIG. 4.
Figure 7:
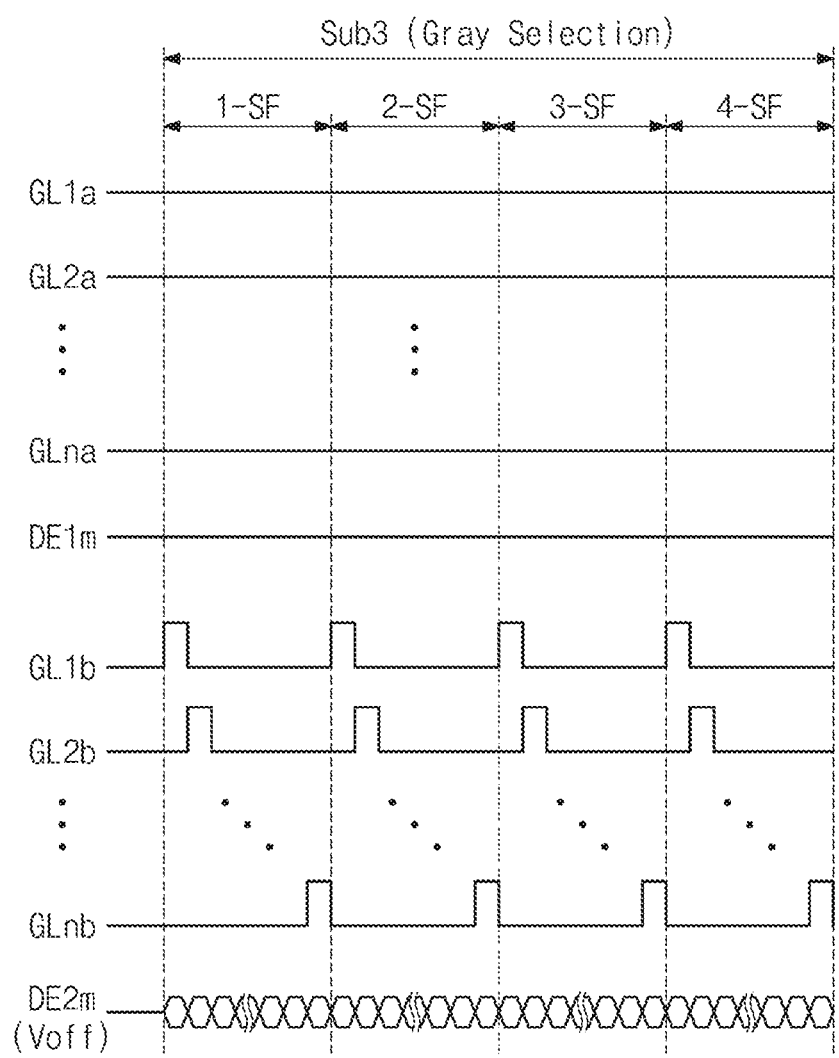
FIG. 7 is a timing diagram showing driving of the display device according to the third sub-frame illustrated in FIG. 4.

FIG. 4 shows driving of a display device based on a unit frame according to an embodiment of the present inventive concept. FIG. 5 is a timing diagram showing driving of the display device according to the first sub-frame illustrated in FIG. 4. FIG. 6 is a timing diagram showing driving of the display device according to the second sub-frame illustrated in FIG. 4. FIG. 7 is a timing diagram showing driving of the display device according to the third sub-frame illustrated in FIG. 4.

First, referring to FIG. 4, as described above, the display device DD according to the embodiment of the present inventive concept may display one image on the basis of a unit frame defined as a plurality of sub-frames.

According to the embodiment of the present inventive concept, the unit frame may include first to third sub-frames Sub1 to Sub3. Hereinafter, the first sub-frame Sub1 is described as a reset period Reset, the second sub-frame Sub2 as a programming period Programming, and the third sub-frame Sub3 as a gray selection period Gray Selection.

Hereinafter, referring to FIGS. 1, 3 and 5, an operation of the display device DD will be described on the basis of the first sub-frame Sub1.

The scan driving circuit 200 sequentially outputs the first scan signals SC1a to SCna to the first scan lines GL1a to GLna. Substantially at the same time, the scan driving circuit 200 sequentially outputs the second scan signals SC1b to SCnb to the second scan lines GL1b to GLnb. For example, the first scan signal SCna and the second scan signal SCnb may be respectively applied to the first scan line GLna and the second scan line GLnb substantially at the same time.

The data driving circuit 300 outputs the first driving voltages DE1m to the first data lines DL1a to DLma in response to an initial signal received from the timing controller 100. In addition, the data driving circuit 300 outputs the second driving voltages DE2m to the second data lines DL1b to DLmb in response to the initial signal. Here, the first driving voltages DE1m and the second driving voltages DE2m may be the initial voltages described above. For example, the data driving circuit 300 may output the first driving voltages DE1m and the second driving voltages DE2m substantially at the same time during the first sub-frame Sub1.

According to an embodiment, during the first sub-frame Sub1, the first driving voltages DE m may have a level of reset voltage VR for resetting the electrochromic element EC, and the second driving voltages DE2m may have a level of on-voltage Von for turning on the fourth transistor TR4. In other words, the second transistor TR2 may deliver the first power supply voltage ECVDD to the fourth transistor TR4 in response to the reset voltage VR.

In other words, for example, when the first scan lines SC1a and SC1b are output to the first scan lines GL1a and GL1b, the first driving voltage DE1m and the second driving voltage DE2m may be output to pixels connected to the first scan lines GL1a and GL1b substantially at the same time.

In this case, the first transistor TR1 of each pixel PXnm may deliver the first driving voltage DE1m to the second transistor TR2 in response to the scan signal SC1a. The second transistor TR2 may deliver the first power supply voltage ECVDD received through the first power line EL1 to the fourth transistor TR4 in response to the first driving voltage DE1m.

The third transistor TR3 may deliver the second driving voltage DE2m to the fourth transistor TR4 in response to the scan signal SC1b. The fourth transistor TR4 may provide the first power supply voltage ECVDD to the electrochromic element EC in response to the second driving voltage DE2m.

For example, the first power supply voltage ECVDD provided to one end of the electrochromic element EC may be higher than the second power supply voltage ECVSS provided to the other end of the electrochromic element EC. In this case, the electrochromic element EC may be bleached during the first sub-frame Sub1.

In relation to FIG. 6, an operation of the display device DD based on the second sub-frame Sub2 will be described.

The scan driving circuit 200 sequentially outputs the first scan signals SC1a to SCna to the first scan lines GL1a to GLna. Substantially at the same time, the scan driving circuit 200 sequentially outputs the second scan signals SC1b to SCnb to the second scan lines GL1b to GLnb. For example, the first scan signal SCna and the second scan signal SCnb may be respectively applied to the first scan line GLna and the second scan line GLnb substantially at the same time.

However, the technical spirit of the present inventive concept is not limited thereto, and the scan driving circuit 200 may differently control output timings of the first scan signals SC1a to SCna and the second scan signals SC1b to SCnb. In other words, the scan driving circuit 200 may not output the second scan signals SC1b to SCnb during the second sub-frame Sub2, but may output the second scan signals SC1b to SCnb during the third sub-frame Sub3. A description thereabout will be provided in relation to FIG. 11.

The data driving circuit 300 outputs the first driving voltages DE1m to the first data lines DL1a to DLma in response to a data signal received from the timing controller 100. In addition, the data driving circuit 300 outputs the second driving voltages DE2m to the second data lines DL1b to DLmb in response to the data signal. Here, the first driving voltages DE1m and the second driving voltages DE2m may be the data voltages described above.

In other words, for example, when the first scan lines SC1a and SC1b are output to the first scan lines GL1a and GL1b, the first driving voltage DE1m and the second driving voltage DE2m may be output to pixels connected to the first scan lines GL1a and GL1b substantially at the same time. Here, the second driving voltage DE2m may have a higher voltage level than the first driving voltage DE1m. In other words, the first driving voltage DE1m may be an analog voltage VD for controlling the grayscale of each of the pixels PX11 to PXnm. On the contrary, the second driving voltage DE2m may be a digital voltage for determining turn-on or turn-off of a transistor. Hereinafter, the second driving voltage DE2m provided to the second data line during the second sub-frame Sub2 may be an on-voltage Von for turning on the third and fourth transistors TR3 and TR4.

On the other hand, the data driving circuit 300 may output the second driving voltage DE2m as the level of the on-voltage Von during each of the first sub-frame Sub1 and the second sub-frame Sub2. However, the present inventive concept is not limited thereto, and different on-voltages Von may be output from the data driving circuit 300 during each of the first sub-frame Sub1 and the second sub-frame Sub2.

The first transistor TR1 of each pixel PXnm may deliver the first driving voltage DE1m to the second transistor TR2 in response to the scan signal SC1a. The second transistor TR2 may deliver the first power supply voltage ECVDD received through the first power line EL1 to the fourth transistor TR4 in response to the first driving voltage DE1m.

The third transistor TR3 may deliver the second driving voltage DE2m, namely, the on-voltage Von to the fourth transistor TR4 in response to the scan signal SC1b. The fourth transistor TR4 may provide the first power supply voltage ECVDD to the electrochromic element EC in response to the second driving voltage DE2m.

According to an embodiment of the present inventive concept, during the second sub-frame Sub2, a voltage level of the first power supply voltage ECVDD to be provided to the electrochromic element EC may be determined according to a voltage level of the first driving voltage DE1m.

For example, the first power supply voltage ECVDD provided to one end of the electrochromic element EC may be lower than the second power supply voltage ECVSS provided to the other end of the electrochromic element EC. In this case, the electrochromic layer ECY may be colored during the second sub-frame Sub2.

Referring to FIG. 7, an operation of the display device DD based on the third sub-frame Sub3 will be described. According to an embodiment of the present inventive concept, the third sub-frame Sub3 may include a plurality of subfields. Here, the plurality of subfields may be time-continuous. Hereinafter, the third sub-frame Sub3 will be described to include time-continuous first to fourth subfields 1-SF to 4-SF. For example, after a period of the first subfield 1-SF is terminated, the second subfield 2-SF starts.

On the other hand, as described in relation to FIG. 6, during the second sub-frame Sub2, the voltage level of the first power supply voltage ECVDD to be provided to the electrochromic element EC may be determined according to the voltage level of the first driving voltage DE1$m$. In other words, coloring of the electrochromic layer ECY may be changed according to the voltage level of the first driving voltage DE1$m$.

According to an embodiment of the present inventive concept, the display device DD may control a quantity of electrons to be provided to the electrochromic materials in an electrolyte layer included in the electrochromic layer ECY.

For example, the longer a period in which the first power supply voltage ECVDD is provided to the electrochromic element EC, the darker the grayscale of the electrochromic layer ECY. On the contrary, the shorter the period in which the first power supply voltage ECVDD is provided to the electrochromic element EC, the brighter the grayscale of the electrochromic layer ECY. In other words, the coloring of the electrochromic element EC may be changed by controlling the time in which the first power supply voltage ECVDD is provided to the electrochromic element EC through the fourth transistor TR4.

For example, the first power supply voltage ECVDD is provided to the electrochromic element EC during the second sub-frame Sub2. Thereafter, during the third sub-frame Sub3, the grayscale of the electrochromic layer ECY may be darker, when the provision of the first power supply voltage ECVDD that has been provided to the electrochromic element EC is blocked in the fourth subfield 4-SF, not in the first subfield 1-SF.

The scan driving circuit 200 does not provide the first scan signals to the first scan lines GL1$a$ to GLna during the third sub-frame Sub3. In other words, the scan driving circuit 200 may provide the first scan signals for turning off the first transistor TR1 and the second transistor TR2 to the first scan lines GL1$a$ to GLna during the third sub-frame Sub3. In this case, the fourth gate terminal of the fourth transistor TR4 receives a voltage from the second capacitor Cst2. As a result, the fourth transistor TR4 may maintain a turn-on state.

According to an embodiment of the present inventive concept, the scan driving circuit 200 sequentially provides the second scan signals to the second scan lines GL1$a$ to GLnb during each of the first to fourth subfields 1-SF to 4-SF.

According to an embodiment of the present inventive concept, the data driving circuit 300 outputs the second driving voltages DE2$m$ to the second data lines DL1$b$ to DLmb during the third sub-frame Sub3. Here, the second driving voltages DE2$m$ may be an off-voltage Voff. As described above, the second driving voltage DE2$m$ may be a digital voltage for determining turn-on or turn-off of a transistor. Hereinafter, during the third sub-frame Sub3, the second driving voltage DE2$m$ provided to the second data line may be an off-voltage Voff for turning off the fourth transistors TR4.

During the third sub-frame Sub3, the data driving circuit 300 may determine subfields respectively corresponding to pixels from among the first to fourth subfields 1-SF to 4-ST. In other words, each pixel receives an off-voltage Voff in one corresponding subfield period from among the subfields. Such a subfield corresponding to each pixel may be determined based on an off control signal provided from the timing controller 100.

The data driving circuit 300 provides an off-voltage to the second data line DLmb on the basis of a subfield corresponding to each pixel. As a result, the third transistor TR3 may deliver the second driving voltage DE2$m$ to the fourth transistor TR4 in response to the second scan signal SCnb. The fourth transistor TR4 is turned off in response to the second driving voltage DE2$m$.

Accordingly, the first power supply voltage ECVDD may be blocked from being provided to the electrochromic element EC through the fourth transistor TR4. As a result, the coloring of the electrochromic layer ECY may be stopped.

FIG. 8 is a table exemplarily showing pixels connected to the first scan line and the second scan line among the plurality of scan lines. FIG. 9 is a table exemplarily showing a data voltage provided to pixels during the third sub-frame. FIG. 10 is an example showing a grayscale of an image displayed by the pixels shown in FIG. 8 on the basis of a unit frame.

Referring to FIG. 8, eight pixels PX11 to PX24 are exemplarily shown from among the plurality of pixels PX11 to PXnm included in the display panel 400 shown in FIG. 1. It is described that the first to fourth pixels PX11 to PX14 are connected to the first scan line GL1 and the fifth to eighth pixels PX21 to PX24 are connected to the second scan line GL2. Here, as described above in relation to FIG. 3, the first scan line GL1 and the second scan line GL2 may respectively include two scan lines GLna and GLnb and two data lines DLmb and DLma.

During the third sub-frame Sub3, the first to fourth pixels PX11 to PX14 receive the first to fourth driving voltages DE21 to DE24, and the fifth to eight pixels PX21 to PX24 receive the fifth to eighth driving voltages DE25 to DE28. Here, the first to eighth driving voltages DE21 to DE28 may be voltages provided to the second data line DLmb between two data lines DLma and DLmb show in FIG. 3. In other words, the first to eighth driving voltages DE21 to DE28 may correspond to the second driving voltage DE2$m$ delivered to the third transistor TR3.

Referring to FIGS. 1 and 9, the timing controller 100 may output, to the data driving circuit 300, an off control signal for determining a time when the first to eighth driving voltages DE21 to DE28 are output. Here, the off control signal has k-bit information (where k is a natural number of 2 or greater), and the number of first to fourth subfields 1-SF to 4-SF included in the third sub-frame Sub3 may be determined based on k bits.

For example, when the off control signal is 2 bits, the third sub-frame Sub3 may include 4 subfields. For example, when the off control signal is 3 bits, the third sub-frame Sub3 may include 8 subfields. In other words, the number of subfields may be the square multiple of 2.

Hereinafter, according to the description of the present inventive concept, the data driving circuit 300 may output the second driving voltage DE2m, which is an off-voltage Voff, to the second data line DLmb on the basis of the off control signal according to 2 bits.

In detail, as shown in FIG. 9, the off control signal having 00 bit information includes output information P for outputting an off-voltage Voff in the fourth subfield 4-SF among the first to fourth subfields 1-SF to 4-SF. The off control signal having 01 bit information includes output information P for outputting an off-voltage Voff in the third subfield 3-SF among the first to fourth subfields 1-SF to 4-SF. The off control signal having 10 bit information includes output information P for outputting an off-voltage Voff in the second subfield 2-SF among the first to fourth subfields 1-SF to 4-SF. The off control signal having 11 bit information includes output information P for outputting an off-voltage Voff in the first subfield 1-SF among the first to fourth subfields 1-SF to 4-SF.

For example, the data driving circuit 300 provides the off-voltage Voff to the second data line DLmb connected to the fourth pixel PX14 in the fourth subfield 4-SF in response to the off control signal having 00 bit information. As a result, the electrochromic element EC receives the first power supply voltage ECVDD during the first to third subfields 1-SF to 3-SF, but thereafter, does not receive the first power supply voltage ECVDD from the time point of the fourth subfield 4-SF.

Accordingly, as shown in FIG. 10, as the off-voltage Voff in the fourth subfield 4-SF is provided to the fourth pixel PX14, the grayscale 80% of the electrochromic layer ECY may be the darkest. This is because the time in which the first power supply voltage ECVDD is provided to the electrochromic element EC is the longest.

For example, the data driving circuit 300 provides the off-voltage Voff to the second data line DLmb connected to the third pixel PX13 in the third subfield 3-SF in response to the off control signal having 01 bit information. As a result, the electrochromic element EC does not receive the first power supply voltage ECVDD after the time point of the third subfield 3-SF.

As shown in FIG. 10, as the off-voltage Voff is provided to the third pixel PX13 in the third subfield 3-SF, the grayscale 50% of the electrochromic layer ECY may be less darker in the third subfield 3-SF than in the fourth subfield 4-SF.

For example, the data driving circuit 300 provides the off-voltage Voff to the second data line DLmb connected to the second pixel PX12 in the second subfield 2-SF in response to the off control signal having 10 bit information. As a result, the electrochromic element EC does not receive the first power supply voltage ECVDD after the time point of the second subfield 2-SF.

As shown in FIG. 10, as the off-voltage Voff is provided to the second pixel PX12 in the second subfield 2-SF, the grayscale 25% of the electrochromic layer ECY may be less darker in the second subfield 2-SF than in the third subfield 3-SF.

For example, the data driving circuit 300 provides the off-voltage Voff to the second data line DLmb in the first subfield 1-SF in response to the off control signal having 11 bit information. As a result, the electrochromic element EC does not receive the first power supply voltage ECVDD after the time point of the first subfield 1-SF.

Accordingly, as shown in FIG. 10, as the off-voltage Voff is provided to the first pixel PX11 in the first subfield 1-SF, the grayscale 0% of the electrochromic layer ECY may be the brightest. As a result, the grayscale 0% of the electrochromic layer ECY may be less darker in the first subfield 1-SF than in the second subfield 2-SF. This is because the time in which the first power supply voltage ECVDD is provided to the electrochromic element EC is the shortest.

Hereinafter, operations of the fifth to ninth pixels PX21 to PX24 are substantially same as those of the first to fourth pixels PX11 to PX14, and thus a description thereabout will be omitted.

Figure 11:
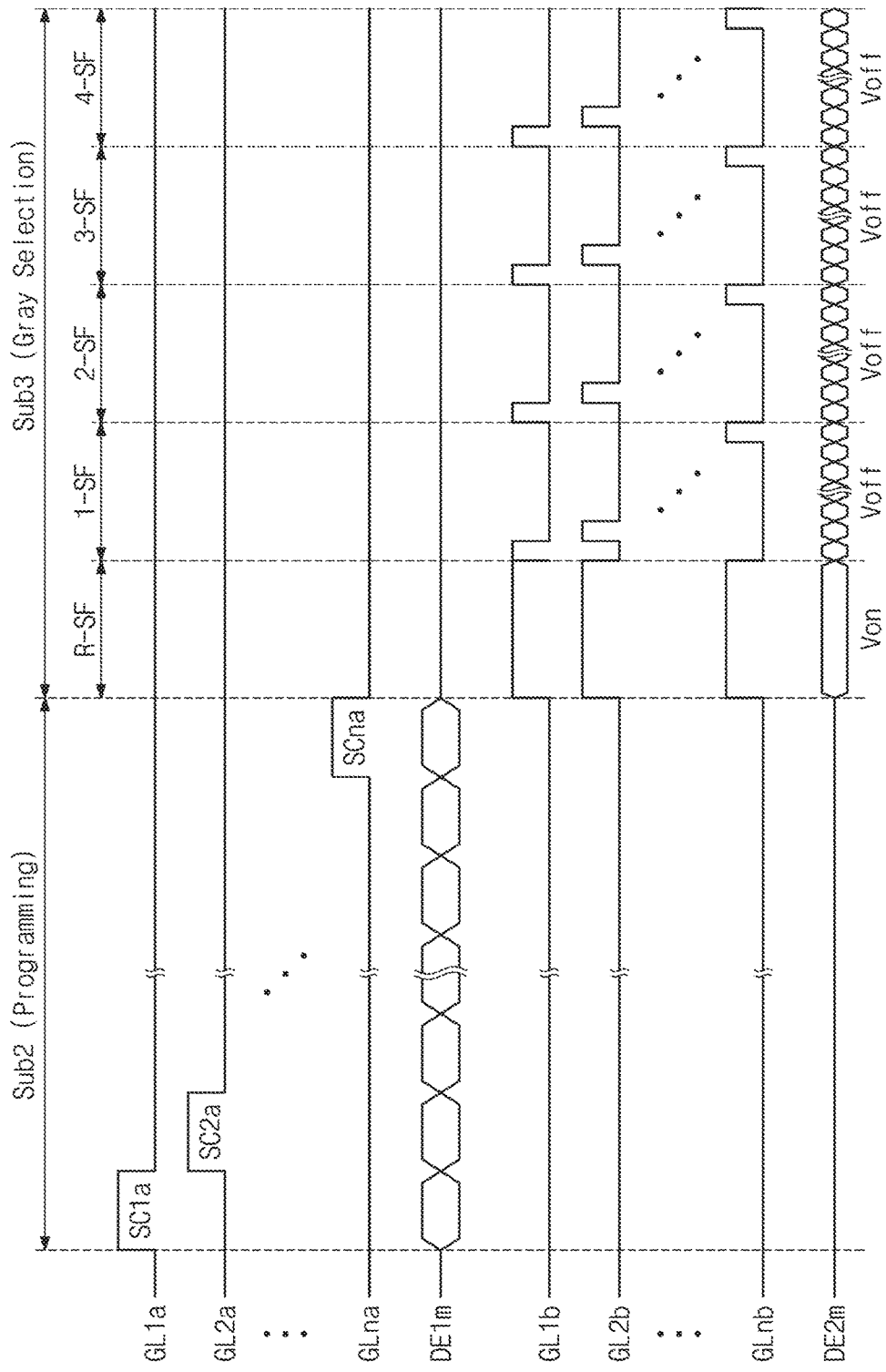
FIG. 11 is a timing diagram showing a unit frame according to another embodiment of the present inventive concepts.

FIG. 11 is a timing diagram showing a unit frame according to another embodiment of the present inventive concept.

Referring to FIGS. 1 and 11, the scan driving circuit 200 does not output the second scan signals during the second sub-frame Sub2. In other words, the scan driving circuit 200 outputs only the first scan signals SC1a to SCna to the first scan lines GL1a to GLna during the second sub-frames period Sub2.

According to an embodiment of the present inventive concept, the third sub-frame Sub3 may include a charging period R-SF and an off period. The off period is defined as the first to fourth subfields 1-SF to 4-SF. In addition, the charging period R-SF may be a subsequent period after the second sub-frame Sub2 and the off period may be a subsequent period after the charging period R-SF.

According to an embodiment of the present inventive concept, the scan driving circuit 200 may output a plurality of second scan signals to the second scan lines GL1b to GLnb during the charging period R-SF substantially at the same time. However, the technical feature of the present inventive concept is not limited thereto and the scan driving circuit 200 may sequentially output the plurality of second scan signals to the second scan lines GL1b to GLnb during the charging period R-SF.

According to the above-described, in the charging period R-SF, the first power supply voltage ECVDD may be provided to the electrochromic element EC shown in FIG. 3.

Thereafter, the same driving scheme as in the third sub-frame Sub3 shown in FIG. 7 may be applied. Accordingly, a description thereabout will be omitted.

Figure 12:
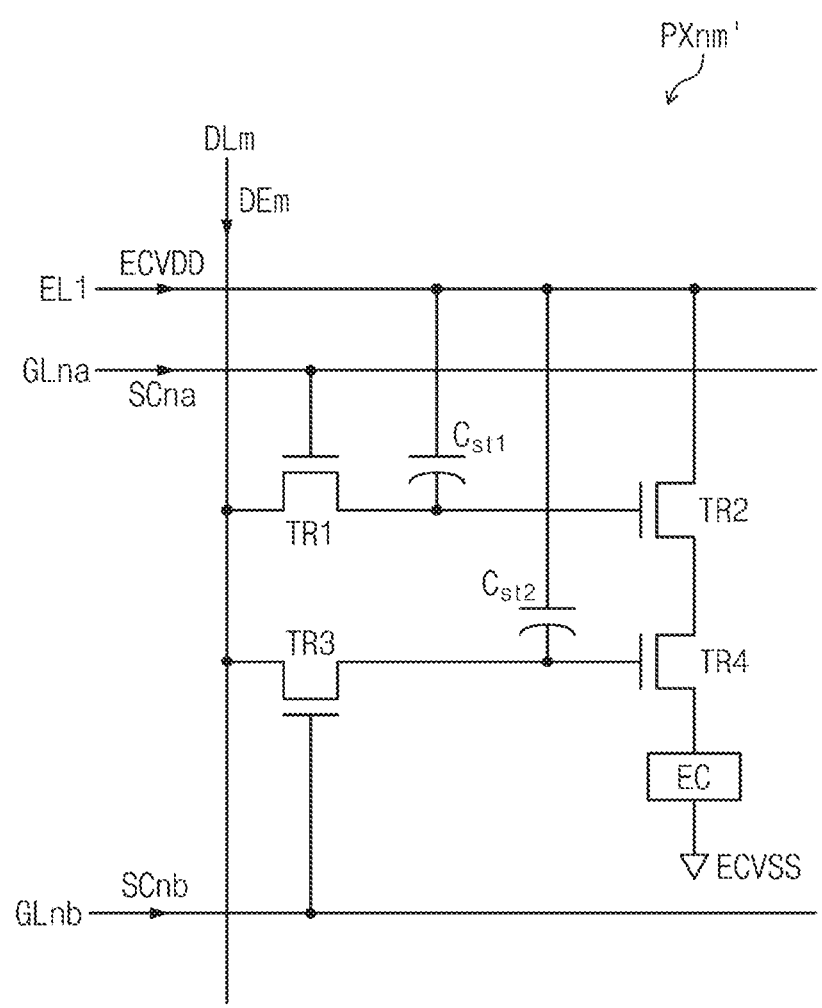
FIG. 12 is a circuit diagram of a pixel according to another embodiment of the present inventive concepts.
Figure 13:
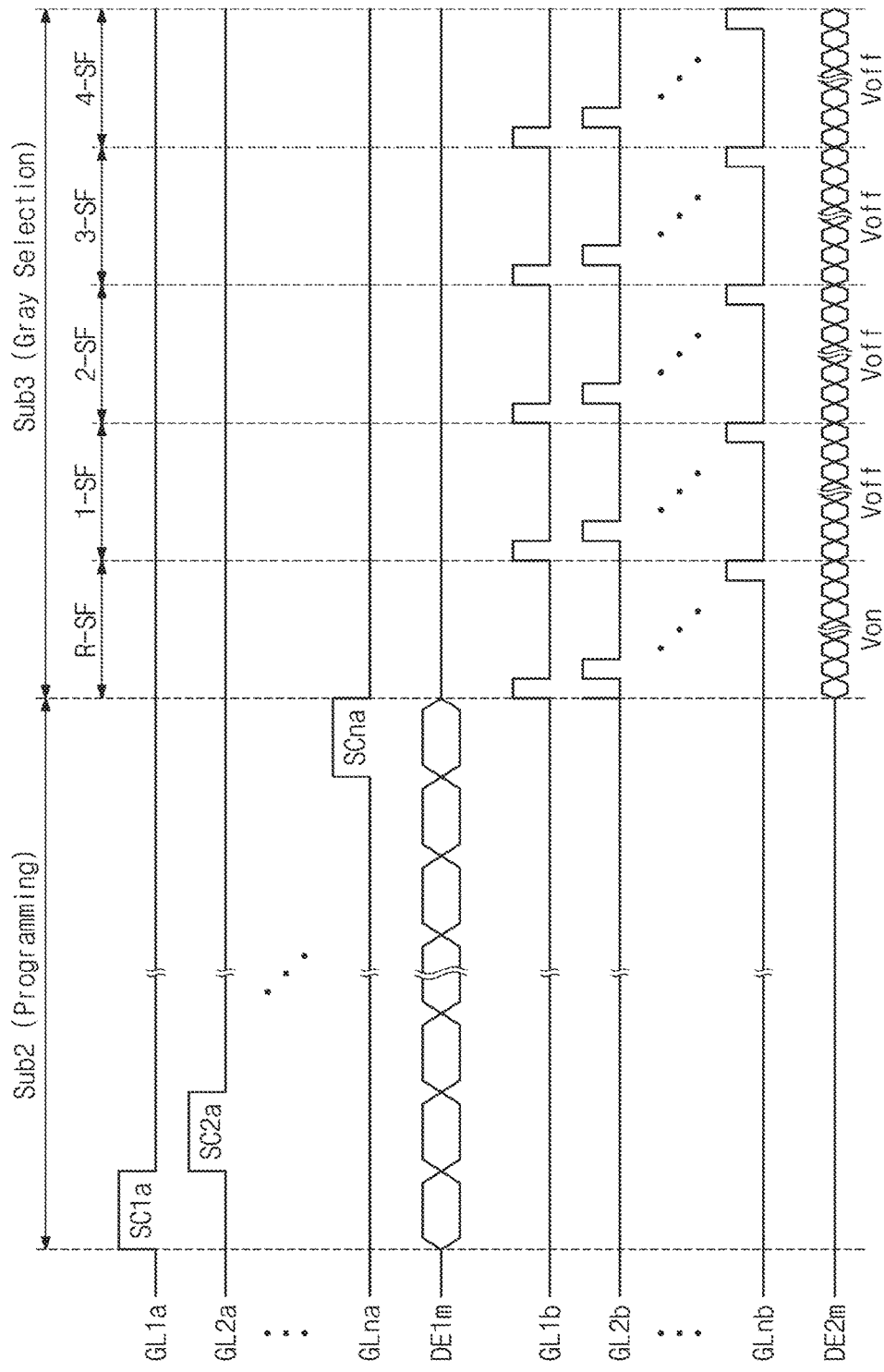
FIG. 13 is a timing diagram showing an operation of a display device based on the pixel illustrated in FIG. 12.

FIG. 12 is a circuit diagram of a pixel according to another embodiment of the present inventive concept. FIG. 13 is a timing diagram showing an operation of the display device based on the pixel illustrated in FIG. 12.

For a pixel PXnm' shown in FIG. 12, only a data line structure is changed in comparison to the pixel PXnm shown in FIG. 3, and the remaining structure thereof may be substantially the same. Accordingly, a description about the remaining structure except the data line structure will be omitted.

Referring to FIGS. 12 and 13, the first transistor TR1 and the third transistor TR3 may be connected to an identical data line DLm, not to different data lines.

In detail, during the second sub-frame Sub2, the scan driving circuit 200 provides the first scan signals SC1a to SCna to the first scan lines GL1a to GLna. In other words, during the second sub-frame Sub2, the first scan signal SCna is provided to the first transistor TR1 through the first scan line GLna included in the pixel PXnm'. In this case, the data driving circuit 300 provides a plurality of first data voltages to the data lines DL1 to DLm. As a result, the second transistor TR2 included in each pixel PXnm' is turned on and the first power supply voltage ECVDD may be delivered to the fourth transistor TR4.

On the other hand, the scan driving circuit 200 does not provide the second scan signals to the second data lines GL1b to GLnb. As a result, during the second sub-frame Sub2, the first power supply voltage ECVDD output from the second transistor TR2 is not delivered to the electrochromic element EC.

During the charging period R-SF in the third sub-frame Sub3, the scan driving circuit 200 sequentially provides the second scan signals to the second scan lines GL1b to GLnb. In this case, the data driving circuit 300 provides the second data voltages to the data lines DL1 to DLm during the charging period R-SF. Accordingly, the third transistor TR3 included in each pixel PXnm' provides the second data voltage to the fourth transistor TR4 in response to the second scan signal. As a result, the fourth transistor TR4 is turned on and the first power supply voltage ECVDD may be delivered to the electrochromic element EC during the charging period R-SF.

Thereafter, operations of the first to fourth subfields 1-SF to 4-SF, which are the off period, are substantially the same as the off period shown in FIG. 7, and thus descriptions thereabout will be omitted.

According to the embodiments of the present inventive concept, the electrochromic display device may control a quantity of electric charges provided to an electrochromic element on the basis of a plurality of sub-frames.

Accordingly, the electrochromic display device may be provided which has excellent visibility and is capable of representing various grayscales.

As described above, exemplary embodiments have been disclosed in this specification and the accompanying drawings. Although specific terms are used herein, they are just used for describing the present disclosure, but do not limit the meanings and the scope of the present invention disclosed in the claims. Accordingly, those skilled in the art will appreciate that various modifications and other equivalent embodiments can be derived from the exemplary embodiments of the present disclosure. Therefore, the scope of true technical protection of the present disclosure should be defined by the technical idea of the appended claims.

What is claimed is:

1. An electrochromic display device comprising:
   a display panel comprising a plurality of pixels configured to display an image on a basis of a unit frame defined as first to third sub-frames;
   a timing controller configured to output a data signal and an off signal; and
   a data driving circuit configured to provide, to the pixels, a data voltage generated based on the data signal during the second sub-frame and provide, to the pixels, an off voltage generated based on the off signal during the third sub-frame,
   wherein each of the pixels comprises an electrochromic element, and
   a power supply voltage is delivered to the electrochromic element in response to the data voltage during the second sub-frame, and the power supply voltage provided to the electrochromic element is blocked in response to the off voltage during the third sub-frame.

2. The electrochromic display device of claim 1, wherein the third sub-frame comprises a plurality of time-continuous first to n-th subfields, and
   the power supply voltage provided to the electrochromic element is blocked at a time point of one corresponding subfield among the first to n-th subfields.

3. The electrochromic display device of claim 2, wherein the timing controller further outputs an off control signal to the data driving circuit, and
   the data driving circuit determines a plurality of subfields respectively corresponding to the pixels among the first to n-th subfields in response to the off control signal.

4. The electrochromic display device of claim 3, wherein the off control signal is provided with k bits (where k is a natural number of 2 or greater), and a number of the first to n-th subfields comprised in the third sub-frame is determined based on the k bits.

5. The electrochromic display device of claim 1, further comprising:
   a power supply driving circuit configured to provide the power supply voltage and a ground voltage to each of the pixels,
   wherein, during the first sub-frame, the power supply driving circuit provides the power supply voltage for resetting the electrochromic element and the ground voltage to the pixels.

6. The electrochromic display device of claim 1, wherein the display panel further comprises a plurality of scan lines, a plurality of data lines, and a power supply line, which are connected to the pixels, and
   each of the scan lines comprises a first scan line and a second scan line, and each of the data lines comprises a first data line and a second data line.

7. The electrochromic display device of claim 6, wherein the data voltage comprises a first data voltage and a second data voltage, and
   each of the pixels comprises:
      a first driving unit connected to the first scan line, the first data line, and the power supply line, and configured to receive the first data voltage through the first data line; and
      a second driving unit connected to the second scan line, the second data line, and the first driving unit, and configured to receive the second data voltage through the second data line.

8. The electrochromic display device of claim 7, wherein, during the second sub-frame, the first driving unit outputs, to the second driving unit, the power supply voltage received through the power supply line in response to the first data voltage, and the second driving unit delivers, to the electrochromic element, the power supply voltage received from the first driving unit in response to the second data voltage.

9. The electrochromic display device of claim 8, wherein, during the third sub-frame, the second driving unit blocks the power supply voltage from being provided to the electrochromic element in response to the off voltage provided through the second data line.

10. The electrochromic display device of claim 6, wherein each of the pixels further comprises:
    a first transistor comprising a first scan terminal connected to the first scan line, a first terminal connected to the first data line, and a second terminal;
    a second transistor comprising a second scan terminal connected to the second terminal, a third terminal connected to the power supply line, and a fourth terminal;
    a third transistor comprising a third scan terminal connected to the second scan line, a fifth terminal connected to the second data line, and a sixth terminal; and
    a fourth transistor comprising a fourth scan terminal connected to the sixth terminal, a seventh terminal connected to the fourth terminal, and an eighth terminal,
    wherein the electrochromic element is connected to the eighth terminal.

11. The electrochromic display device of claim 10, wherein each of the pixels further comprises:
    a first capacitor disposed between the power supply line and a node between the first and second transistors; and
    a second capacitor disposed between the power supply line and a node between the third and fourth transistors.

12. The electrochromic display device of claim 1, further comprising:
    a power supply driving circuit configured to output the power supply voltage and a ground voltage,
    wherein the power supply driving circuit provides the power supply voltage to one end of the electrochromic element, and provides the ground voltage to another end of the electrochromic element.

13. The electrochromic display device of claim 1, wherein the display penal comprises:
    a first base substrate;
    a display layer comprising the pixels on the first base substrate;
    an electrochromic layer on the display layer;
    a common electrode layer on the electrochromic layer, and
    a second base substrate on the common electrode layer.

14. An electrochromic display device comprising:
    a display panel comprising a plurality of pixels configured to display an image on a basis of a unit frame defined as first to third sub-frames, a plurality of scan lines connected to the pixels, a plurality of data lines, and a power supply line;
    a timing controller configured to output a data signal and an off signal; and
    a data driving circuit configured to provide, to the pixels, a first data voltage generated based on the data signal during the second sub-frame and provide, to the pixels, a second data voltage generated based on the data signal, and an off voltage generated based on the off signal, during the third sub-frame,
    wherein each of the pixels comprises an electrochromic element,
    the third sub-frame comprises a charging period and an off period subsequent to the charging period, and
    a power supply voltage is delivered to the electrochromic element in response to the second data voltage during the charging period, and the power supply voltage provided to the electrochromic element is blocked in response to the off voltage during the off period.

15. The electrochromic display device of claim 14, wherein each of the scan lines comprises a first scan line and a second scan line, and each of the data lines comprises a first data line and a second data line, and
    each of the pixels further comprises:
        a first driving unit connected to the first scan line, the first data line, and the power supply line, and configured to receive the first data voltage through the first data line, during the second sub-frame; and
        a second driving unit connected to the second scan line, the second data line, and the first driving unit, and configured to receive the second data voltage through the second data line during the charging period.

16. The electrochromic display device of claim 15, wherein, during the off period, the second driving unit blocks the power supply voltage from being provided to the electrochromic element in response to the off voltage received through the second data line.

17. The electrochromic display device of claim 14, wherein each of the scan lines comprises a first scan line and a second scan line, and
    each of the pixels further comprises:
        a first transistor comprising a first scan terminal connected to the first scan line, a first terminal connected to a corresponding data line among the data lines, and a second terminal;
        a second transistor comprising a second scan terminal connected to the second terminal, a third terminal connected to the power supply line, and a fourth terminal;
        a third transistor comprising a third scan terminal connected to the second scan line, a fifth terminal connected to the data line, and a sixth terminal; and
        a fourth transistor comprising a fourth scan terminal connected to the sixth terminal, a seventh terminal connected to the fourth terminal, and an eighth terminal,
    wherein the electrochromic element is connected to the eighth terminal.

18. The electrochromic display device of claim 17, wherein the data driving circuit outputs the first data voltage to the first data line during the second sub-frame, and outputs the second data voltage to the data line during the charging period.

19. The electrochromic display device of claim 18, wherein the data driving circuit outputs the off voltage to the data line during the off period.

* * * * *